United States Patent [19]

Shibano et al.

[11] 4,021,817

[45] May 3, 1977

[54] METHOD OF MANUFACTURE OF ANTENNA REFLECTOR HAVING A PREDETERMINED CURVED SURFACE

[75] Inventors: Yoshizo Shibano, Osaka; Tetsuo Hatano, Takatsuki; Toshihiko Ohkura, Amagasaki, all of Japan

[73] Assignee: Sumitomo Electric Industries, Ltd., Osaka, Japan

[22] Filed: Oct. 29, 1975

[21] Appl. No.: 626,752

[30] Foreign Application Priority Data

Nov. 5, 1974 Japan ............................ 49-127297
Oct. 16, 1975 Japan ............................ 50-124709
Oct. 16, 1975 Japan ............................ 50-124710

[52] U.S. Cl. ................................ 343/912; 29/600; 72/478
[51] Int. Cl.² ........................................ H01Q 15/16
[58] Field of Search ......................... 343/912, 915; 72/DIG. 15, 473, 478; 29/600

[56] References Cited

UNITED STATES PATENTS

| | | | |
|---|---|---|---|
| 1,336,388 | 4/1920 | Youngberg | 72/DIG. 15 |
| 1,449,385 | 3/1923 | Dietrich | 72/DIG. 15 |
| 2,372,418 | 3/1945 | Forbes et al. | 72/DIG. 15 |
| 2,969,544 | 1/1961 | DiMarco et al. | 343/912 |
| 3,897,294 | 7/1975 | MacTurk | 343/912 |

*Primary Examiner*—Eli Lieberman
*Attorney, Agent, or Firm*—Carothers and Carothers

[57] ABSTRACT

A method of forming an antenna reflector having a predetermined curved surface by forcing a plate of metal or plastic upon an array of die members of different heights protruding from a die base, for example, coaxially arranged cylinders of proper height with proper spacing on the die base. This process makes the manufacture of the antenna reflector extremely rapid and easy.

8 Claims, 3 Drawing Figures

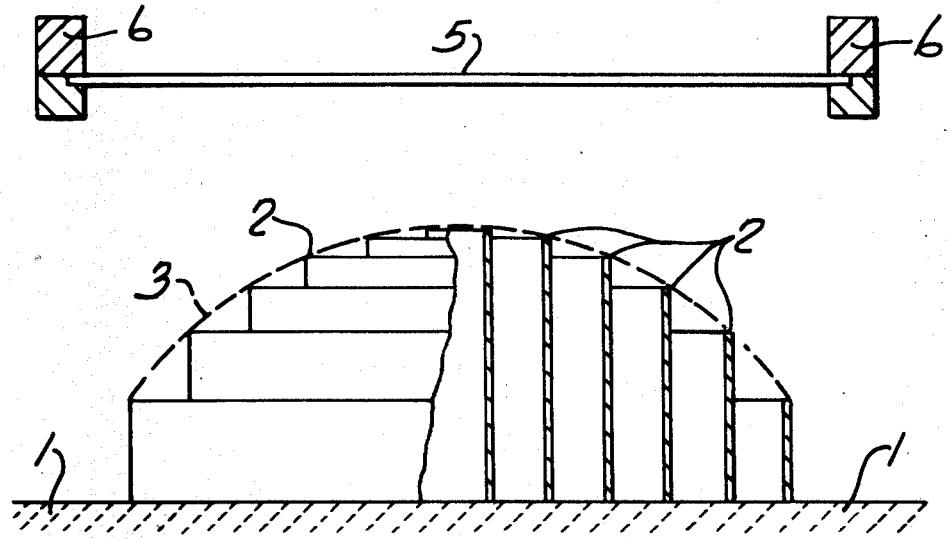
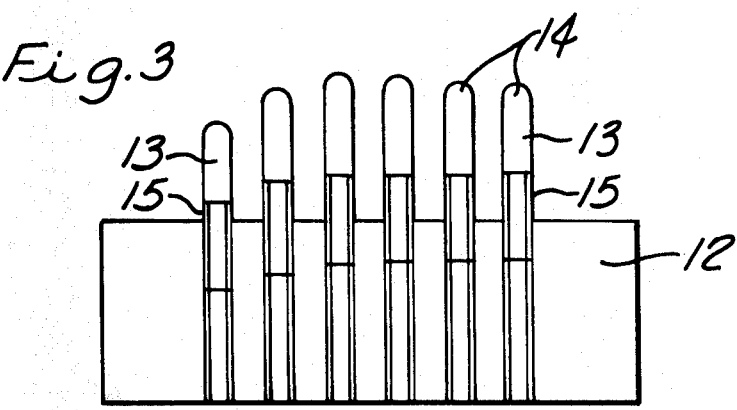
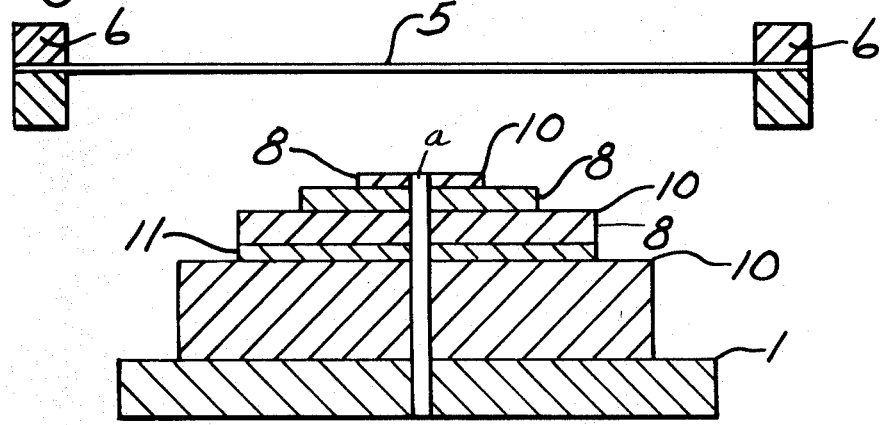

METHOD OF MANUFACTURE OF ANTENNA REFLECTOR HAVING A PREDETERMINED CURVED SURFACE

BACKGROUND OF THE INVENTION

1. Field of the Invention

This invention relates to an antenna reflector having a predetermined curved surface and a method of manufacturing the same.

2. Description of the Prior Art

The methods heretofore employed for the manufacture of an antenna reflector having a reflecting surface of a predetermined curvature require the use of, for example, a die surface on a revolving body. One such method employs a spinning deforming process wherein a metal plate is fixed upon the revolving die and deformed by means of a roller or float which presses the plate on the revolving die. Another is known as the pressing process wherein a metal plate is squeezed and pressed between male-form and female-form dies. Still another is the hammering process wherein a metal plate is deformed by hammering the plate on a jig so as to conform the shape of the metal plate to the curved surface of the jig die. However, with any of these methods, it has been frequently necessary to correct the resultant deformed metal plate to obtain the desired shape and this takes a lot of time during the finishing process. Thus, the cost of the products manufactured by these methods becomes very high and a lot of time is needed for manufacture. Moreover, when using a die, only one type of product can be produced. When the material of the plate and the thickness of the plate are changed, the same die can not be used. Because of the above, the adaptability of the die is very restricted.

SUMMARY OF THE INVENTION

The present invention has removed these difficulties and makes it possible to manufacture an antenna reflector having a predetermined curved surface rapidly and in a very simple way without impairing the electric properties of the antenna.

According to the present invention, the manufacturing error of the formed antenna reflector due to the resilience of the material used or the thickness of the processed plate is very easily removed by means of an adjusting device on the die.

According to the present invention, the predetermined curved surface of the die is easily changed by means of an adjusting device on the die.

According to the method of the present invention, an antenna reflector having a predetermined concave curved surface contour is manufactured by grouping a plurality of die members having die forming protrusions on a die base and selectively adjusting the height of said die members from the die base to thereby position the aforesaid die protrusions in a convex surface contour conforming to the desired concave surface contour of the reflector. The perimetrical edge or edges of a plastic blank, such as a metal or synthetic plastic, are engaged by a press which forces the blank under pressure downwardly or onto the aforesaid die forming protrusions and thereby forms the blank into an antenna reflector having the required concave surface contour.

The die members may be supplied by a number of different die configurations such as a plurality of different diameter cylinders which are coaxially arranged on the die base with the exposed top circular ends thereof extending upwardly from the base to form the aforesaid die protrusions. The die members may also be in the form of discs which are coaxially stacked in a pyramid fashion to expose the top circular edges of each disc as the die protrusions. As a further alternative the die members may be selected as a grouped plurality of rods which extend in parallel from the die base with the extended ends thereof forming the aforesaid die protrusions. No matter what type of die member is selected, the height of the die protrusions is individually accomplished by lifting selected of the die members above the base surface with a device such as a lifting screw or a gauging spacer.

BRIEF DESCRIPTION OF THE DRAWINGS

FIG. 1 is a diagrammatic view in elevation of one of the antenna reflector die embodiments with portions thereof cut away for explaining the method of the present invention.

FIG. 2 is a diagrammatic section view in elevation of another embodiment of the present invention.

FIG. 3 is a section view in elevation of another type of die used in the method of the present invention.

DETAILED DESCRIPTION OF THE INVENTION

The present invention will now be explained with respect to the embodiments with reference to the accompanying drawings. FIG. 1 is an elevation view of the die of the invention, a part of which is cut away. In FIG. 1, 1 is the base of the die and 2 designates cylinders having the proper thickness, which is determined by their mechanical strength requirements, whose top edges lie in a flat plane and are made round for the convenience of forming a plate thereon. These cylinders 2 are arranged coaxially on the die base 1 so as to make an approximate enveloped surface 3 which is the predetermined curved surface of the reflecting surface of the antenna. 5 is a circular plate of metal or plastic whose circumferential edge is fixed tightly thereabound by the frame 6 of an actuation device which is moved downward for pressing and drawing or forming of plate 5 by means of a screw press or hydraulic pressure device. A metal circular plate 5 is forced upon the tops of the cylinders 2 so as to form a concave surface in the metal plate in conformity to the envelope surface 3 of the tops of the cylinders 2.

When the plate to be processed does not have enough plasticity for forming, the forming of the plate is easily done by first heating the plate to an elevated temperature.

The approximation of the deformed surface of the metal plate to the desired predetermined surface is increased easily by using more cylinders 2 over a unit length. It is preferable to increase the number of cylinders 2 around an area of deformation having a large degree of curvature.

When using our invention to make an antenna reflector with a diameter of 500 mm, a parabolic surface curve having a surface precision whose root mean square error is equal to ±0.5 mm, an aperture angle of 60° and an operating frequency of 12 GHz, it is necessary to provide at least five cylinders 2 with each having a wall-thickness of 20 mm and arranged coaxially on the die base 1. These five cylinders 2 are equally spaced and arranged coaxially in descending order so that the highest cylinder is in the center and the lowest cylinder is at the outermost position so as to obtain an enveloped surface 3 of the tops of the cylinders which approximates the desired parabolic surface within the necessary limits. The antenna reflector produced by this method has an approximated curved surface whose error of approximation is within ±0.36 mm. This error of approximation is within the required value for the operating frequency.

The height of cylinders 2 is adjustable by means of a screw device (not shown) provided between the bottom portion of the cylinders and the die base 1 and by gauge spacing pieces (not shown) placed under the cylinders.

It is thus possible to change the heights of the cylinders to a large degree to make a different enveloped surface approximating a new predetermined curved surface.

Another embodiment of the present invention is shown in FIG. 2 wherein the cylinders of the first embodiment are replaced by a group of discs having the proper thickness and radius. They are so placed upon one another such that a surface consisting of the upper exposed edges of the discs provides an approximate predetermined curved surface, for example, a parabolic surface.

In FIG. 2, 1 is a die base and numeral 8 are discs, each having the proper thickness and diameter and a central hole with a vertical rod $a$ passing through it and extending from die base 1. The edge or edge protrusions 10 of each disc facing the deforming plate is made round for the convenience a forming of plate. 11 is a gauging spacer for adjusting the height of the disc, 5 is a plate to be formed into an antenna reflector which is made of a plastic material such as metal or a synthetic resin, 6 is a frame fixing the circumferential edge of the plate 5 which is moved downward for forming upward for retraction by means of a screw device or a hydraulic pressure device. The method of manufacturing the antenna reflector with the die structure of FIG. 2 is the same as that explained with regard to FIG. 1.

FIG. 3 shows another embodiment of the present invention. In FIG. 3, 12 is a die base, numerals 13 indicate iron which rods have adjustments screws 15 at their bottom portions for the purpose of adjusting the height of rods, and 14 designates the tops of the rods 13, which are made round for the convenience of forming the plate. The plate to be formed into an antenna reflector is pressed down upon the tops of the rods 13 by means of a pressure device in the same manner as described with reference to FIG. 1.

According to the method of the present invention, an antenna reflector having a predetermined curved surface is rapidly made and, moreover, is made a low cost.

According to the present invention, the enveloped surface of the tops of the protusions on the die are easily adjusted by means of a screw device or gauging spacers so that it is not necessary to prepare various different dies for making antenna reflectors having different resiliencies due to different materials or for making antennas having slightly modified surfaces.

What we claim are:

1. A method of forming an antenna reflector having a predetermined concave curved surface contour comprising the steps of grouping a plurality of die members having die forming protrusions on a die base, selectively adjusting the height of said die members from said die base to thereby position said die protrusions in a convex surface contour conforming to the desired concave surface contour of the reflector to be formed, engaging the perimetrical edge of a plastic blank to be formed into a reflector with press means, and forcing said blank under pressure with said press means onto said die forming protrusions and thereby forming said blank into an antenna reflector having said desired concave surface contour.

2. The method of claim 1 wherein said die members are selected as a plurality of different diameter cylinders coaxially arranged on said die with the exposed top circular ends thereof extending upward from said base to form said die protrusions.

3. The method of claim 2 wherein the step of adjusting the height of said die protrusions is accomplished by individually lifting selected of said cylinders above said base with a device such as lifting screw or gauging spacer.

4. The method of claim 1 wherein said die members are selected as a pluraltiy of discs of different diameter and including the step of coaxially stacking said discs on said die base in pyramid fashion to expose the top circular edges thereof as said die protrusions.

5. The method of claim 4 wherein the step of adjusting the height of said die protrusions is accmplished by inserting gauging spacers under selected of said discs.

6. The method of claim 1 wherein said die members are selected as a grouped plurality of rods which are extended in parallel from said die base with the extended ends thereof forming said die protrusions.

7. The method of claim 6 wherein the step of adjusting the height of said die protrusions is accomplished by individually lifting selected of said rods above said base with screw lifts.

8. An antenna reflector manufactured by a process comprising the steps of grouping a plurality of die members having die forming protrusions on a die base, selectively adjusting the height of said die members from said die base to thereby position said die protrusions in a convex surface contour conforming to the desired concave surface contour of the reflector to be formed, engaging the perimetrical edge of a plastic blank to be formed into a reflector with press means, and forcing said blank under pressure with said press means onto said die forming protrusions and thereby forming said blank into an antenna reflector having said desired concave surface contour.

* * * * *